Patented Aug. 15, 1933

1,922,482

UNITED STATES PATENT OFFICE 1,922,482

HALOGENDIBENZOPYRENEQUINONES

Max Albert Kunz, Mannheim, and Karl Koeberle and Erich Berthold, Ludwigshafen-on-the-Rhine, Germany, assignors to General Aniline Works, Inc., New York, N. Y., a Corporation of Delaware No Drawing. Application June 25, 1930, Serial No. 463,822, and in Germany June 27, 1929

8 Claims. (Cl. 260—61)

The present invention relates to the production of halogenated dibenzopyrenequinones.

We have found that dibenzopyrenequinones which term is meant to comprise 3.4.8.9-dibenzopyrene-5.10-quinone, 4.5.8.9-dibenzopyrene-3.10-quinone and derivatives thereof, are readily halogenated by treating a dibenzopyrenequinone in aqueous suspension with chlorine, bromine or agents supplying these halogens which are not decomposed by water. As agents supplying the said halogens alkali metal hypochlorites and hypobromites may for example be used, not however, sulphuryl chloride, since it is decomposed by water. The aqueous suspension may be employed as such or may be made slightly acid or alkaline. The known halogenating catalysts may be added to the reaction mixture, for example iodine, sulphur, metals, such as iron or copper, or compounds thereof, but the presence of such catalysts is not necessary. The initial material is preferably employed in a finely divided condition and it may be brought into this state during halogenation by grinding it during reaction. Halogenation takes already place at ordinary temperature, but it is advantageous to slightly warm the reaction mixture in order to increase the speed of the reaction. In case higher halogenated products are desired it may sometimes be advisable to carry out halogenation in a closed vessel, when brominating at elevated temperatures it is sufficient to brominate under a reflux condenser.

When halogenating by means of free halogens it is advisable to neutralize the nascent hydrogen halide or to add a buffer compound to the aqueous suspension in order to keep the reaction mixture about neutral during reaction. When halogenating by means of alkali metal hypochlorites or hypobromites it is preferable to slightly acidify the aqueous paste. The excess of halogenating agent, if such has been used, may be removed and the bromine recovered by distillation.

The process is a very convenient method of producing halogenated dibenzopyrenequinones, since the products are directly obtained mostly in a pure condition and in form of their aqueous pastes which may immediately be used for dyeing. If necessary the products may be purified according to known methods, for example by crystallization from higher boiling solvents, by way of their oxonium salts, or by a treatment with oxidizing agents.

Derivatives of the said dibenzopyrenequinones which may be halogenated in the aforesaid manner, comprise for example dibenzopyrenequinones already containing halogen and produced according to the same or other methods the products obtain comprising compounds containing different halogens. Hydroxy-, alkoxy-, aminodibenzopyrenequinones may likewise be halogenated according to the aforedescribed method.

The following examples will further illustrate the nature of the invention, but the invention is not restricted thereto. The parts are by weight.

Example 1

332 parts of a 10 per cent aqueous paste of 3.4.8.9-dibenzopyrene-5.10-quinone are slowly heated, while stirring, to between about 65° to 70° C. after the addition of 90 parts of bromine. The reaction mixture is kept at the same temperature until a sample furnishes golden orange shades on cotton. Any bromine which may be present, is then recovered by distillation, the reaction mixture allowed to cool, the product filtered off and washed until neutral. The bromo-3.4.8.9-dibenzopyrene-5.10-quinone thus obtained is ready for dyeing. It dissolves in concentrated sulphuric acid to give a violet solution and furnishes on cotton from a blue red vat strong clear golden orange shades of excellent fastness. The product may, if necessary, be purified according to known methods, for example by crystallization or by way of its oxonium salts or by treatment with oxidizing agents.

By grinding monochloro-3.4.8.9-dibenzoprene-5.10-quinone in aqueous suspension with bromine in a ball mill a bromochloro-3.4.8.9-dibenzopyrene-5.10-quinone dyeing golden yellow shades is obtained.

The bromo derivative of monomethoxy-3.4.8.9-dibenzopyrene-5.10-quinone obtained in an analogous manner dyes cotton strong reddish yellow shades.

Example 2

332 parts of a 10 per cent aqueous paste of pure 3.4.8.9-dibenzopyrene-5.10-quinone are heated, while stirring, and introducing a current of chlorine, at between 90° and 100° C. until a sample exhibits a content of chlorine. The reaction mixture is then allowed to cool and worked up as described in Example 1. The chloro-3.4.8.9-dibenzopyrene-5.10-quinone thus obtained dyes the vegetable fibre yellow shades of very good fastness. The product crystallizes in the form of needles from high boiling organic solvents and dissolves in concentrated sulphuric acid to give a blue red colouration.

*Example 3*

332 parts of a 10 per cent aqueous paste of 4.5.8.9-dibenzopyrene-3.10-quinone are treated after the addition of 40 parts of a 10 per cent caustic soda solution with 50 parts of bromine. The reaction mixture is then warmed, while stirring, to between 70° and 80° C. and kept thereat for about 20 to 24 hours, whereupon it is allowed to cool and worked up as described in Example 1. The bromo-4.5.8.9-dibenzopyrene-3.10-quinone is obtained in the form of a red paste and forms a red powder when dried, crystallizes in red needles, dissolves in concentrated sulphuric acid to give an olive green solution and dyes the vegetable fibre strong red shades of excellent fastness from an orange vat.

What we claim is:

1. A process of producing halogenated dibenzopyrenequinones, which comprises treating a dibenzopyrenequinone in aqueous suspension with an agent selected from the group consisting of chlorine, bromine and compounds capable of supplying bromine and chlorine which are not decomposed when brought together with water.

2. A process of producing halogenated dibenzopyrenequinones, which comprises treating a dibenzopyrenequinone in aqueous suspension with bromine.

3. A process of producing halogenated dibenzopyrenequinones, which comprises treating a dibenzopyrenequinone in a finely divided condition in aqueous suspension with an agent selected from the group consisting of chlorine, bromine and compounds capable of supplying bromine and chlorine which are not decomposed when brought together with water.

4. A process of producing halogenated dibenzopyrenequinones, which comprises grinding a dibenzopyrenequinone in aqueous suspension with an agent selected from the group consisting of chlorine, bromine and compounds capable of supplying bromine and chlorine which are not decomposed when brought together with water.

5. A process of producing halogenated dibenzopyrenequinones, which comprises grinding a dibenzopyrenequinone in aqueous suspension with bromine.

6. A process of producing halogenated dibenzopyrenequinones, which comprises treating a 3.4.8.9-dibenzopyrene-5.10-quinone in aqueous suspension with an agent selected from the group consisting of chlorine, bromine and compounds capable of supplying bromine and chlorine which are not decomposed when brought together with water.

7. A process of producing halogenated dibenzopyrenequinones, which comprises treating a 3.4.8.9-dibenzopyrene-5.10-quinone in aqueous suspension with bromine.

8. A process of producing halogenated dibenzopyrenequinones, which comprises treating a 3.4.8.9-dibenzopyrene-5.10-quinone in aqueous suspension with bromine until two atoms of bromine have been taken up.

MAX ALBERT KUNZ.
KARL KOEBERLE.
ERICH BERTHOLD.